US012536960B2

(12) United States Patent
Jeong et al.

(10) Patent No.: US 12,536,960 B2
(45) Date of Patent: Jan. 27, 2026

(54) PIXEL CIRCUIT AND DISPLAY DEVICE INCLUDING THE SAME

(71) Applicant: Samsung Display Co., LTD., Yongin-si (KR)

(72) Inventors: Keuk-Jin Jeong, Yongin-si (KR); Wongyun Kim, Yongin-si (KR); Jihoon Yang, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/890,456

(22) Filed: Sep. 19, 2024

(65) Prior Publication Data

US 2025/0104632 A1 Mar. 27, 2025

(30) Foreign Application Priority Data

Sep. 25, 2023 (KR) ........................ 10-2023-0128523

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0465* (2013.01); *G09G 2310/08* (2013.01)

(58) Field of Classification Search
CPC .. G09G 3/3233; G09G 3/3266; G09G 3/3225; G09G 3/32; G09G 3/3258; G09G 3/3208; G09G 3/3275; G09G 3/3291; G09G 3/30; G09G 3/20; G09G 2300/0842; G09G 2300/0426; G09G 2300/0819; G09G 2300/0861; G09G 2300/0852; G09G 2300/0452; G09G 2320/0233;
(Continued)

(56) References Cited

U.S. PATENT DOCUMENTS

2017/0148383 A1* 5/2017 Kim ..................... G09G 3/3275
2018/0075804 A1* 3/2018 Kim ..................... G09G 3/3233
(Continued)

FOREIGN PATENT DOCUMENTS

CN 112509523 A 3/2021
KR 102176454 B1 11/2020
KR 102323292 B1 11/2021

*Primary Examiner* — Dong Hui Liang
(74) *Attorney, Agent, or Firm* — CANTOR COLBURN LLP

(57) ABSTRACT

A pixel circuit includes a light emitting element including an anode electrode and a cathode electrode, a driving transistor including a gate electrode connected to a first node, a first electrode connected to a second node, and a second electrode connected to a third node, a data write transistor including a gate electrode, a first electrode, and a second electrode connected to the second node, a compensation transistor including a gate electrode, a first electrode connected to the third node, and a second electrode connected to the first node, an initialization transistor including a gate electrode, a first electrode, and a second electrode connected to the first node, a first light emission control transistor including a gate electrode, a first electrode, and a second electrode connected to the second node, and a storage capacitor including a first electrode and a second electrode connected to the first node.

20 Claims, 9 Drawing Sheets

(58) Field of Classification Search
CPC ....... G09G 2320/043; G09G 2320/045; G09G 2310/08; G09G 2310/0251; G09G 2310/0262; G09G 2330/021
See application file for complete search history.

(56) References Cited

U.S. PATENT DOCUMENTS

| | | | | |
|---|---|---|---|---|
| 2021/0287610 | A1* | 9/2021 | Kim | G09G 3/3266 |
| 2022/0230592 | A1* | 7/2022 | Zhao | G09G 3/3258 |

* cited by examiner

PIXEL CIRCUIT AND DISPLAY DEVICE INCLUDING THE SAME

This application claims priority to Korean Patent Application No. 10-2023-0128523, filed on Sep. 25, 2023, and all the benefits accruing therefrom under 35 USC § 119, the content of which in its entirety is herein incorporated by reference.

BACKGROUND

1. Field

The invention relates to a pixel circuit, and more particularly to a pixel circuit have a high PPI and a display device including the same.

2. Description of the Related Art

Generally, a display device may include a display panel and a display panel driver. The display panel may include gate lines, data lines, emission lines, and pixel circuits. The display panel driver may include a gate driver for providing a gate signal to the gate lines, a data driver for providing a data voltage to the data lines, an emission driver for providing an emission signal to the emission lines, and a driving controller for controlling the gate driver, the data driver, and the emission driver.

Recently, a display device which provides a virtual reality (VR) or an augmented reality (AR) have been gaining prominence. In this case, since the pitch occupied by a pixel circuit is narrowed, there may be a limitation on a number of transistors constituting the pixel circuit and signals applied to the pixel circuit.

SUMMARY

Embodiments of the invention provide a pixel circuit for a low area and a high PPI.

Embodiments of the invention provide a display device including the pixel circuit.

In an embodiment, the pixel circuit includes a light emitting element including an anode electrode and a cathode electrode receiving a second power voltage, a driving transistor including a gate electrode connected to a first node, a first electrode connected to a second node, and a second electrode connected to a third node, a data write transistor including a gate electrode receiving a data write gate signal, a first electrode connected to a data line configured to provide a data voltage, and a second electrode connected to the second node, a compensation transistor including a gate electrode receiving the data write gate signal, a first electrode connected to the third node, and a second electrode connected to the first node, an initialization transistor including a gate electrode receiving an initialization gate signal, a first electrode receiving an initialization voltage, and a second electrode connected to the first node, a first light emission control transistor including a gate electrode receiving the data write gate signal, a first electrode receiving a first power voltage, and a second electrode connected to the second node, and a storage capacitor including a first electrode receiving the first power voltage and a second electrode connected to the first node.

In an embodiment, the data write transistor is an N-type transistor and the first light emission control transistor may be a P-type transistor.

In an embodiment, the data write transistor and the first light emission control transistor may form a Complementary Metal-Oxide-Semiconductor (CMOS).

In an embodiment, the pixel circuit may further include a second light emission control transistor including a gate electrode receiving the data write gate signal, a first electrode connected to the third node, and a second electrode connected to the anode electrode.

In an embodiment, the compensation transistor may be an N-type transistor and the second light emission control transistor may be a P-type transistor.

In an embodiment, the compensation transistor and the second light emission control transistor may form a CMOS.

In an embodiment, in a first period, the initialization gate signal and the data write gate signal may have a high voltage level.

In an embodiment, in the first period, the initialization transistor may be configured to provide the initialization voltage to the first node and the initialization transistor and the compensation transistor may be configured to provide the initialization voltage to the third node.

In an embodiment, in a second period after the first period, the initialization gate signal may have a low voltage level and the data write gate signal may have the high voltage level.

In an embodiment, in the second period, the data voltage may be provided to the gate electrode of the driving transistor through the data write transistor, the driving transistor, and the compensation transistor.

In an embodiment, in the second period, when the compensation transistor is turned on, the compensation transistor may diode-connect the driving transistor.

In an embodiment, in a third period after the second period, the initialization gate signal and the data write gate signal may have the low voltage level.

In an embodiment, in the third period, a driving current of the driving transistor may flow to the light emitting element.

In an embodiment, the display device includes a display panel including a pixel circuit and a display panel driver configured to drive the display panel. The pixel circuit includes a light emitting element including an anode electrode and a cathode electrode receiving a second power voltage, a driving transistor including a gate electrode connected to a first node, a first electrode connected to a second node, and a second electrode connected to a third node, a data write transistor including a gate electrode receiving a data write gate signal, a first electrode connected to a data line configured to provide a data voltage, and a second electrode connected to the second node, a compensation transistor including a gate electrode receiving the data write gate signal, a first electrode connected to the third node, and a second electrode connected to the first node, an initialization transistor including a gate electrode receiving an initialization gate signal, a first electrode receiving an initialization voltage, and a second electrode connected to the first node, a first light emission control transistor including a gate electrode receiving the data write gate signal, a first electrode receiving a first power voltage, and a second electrode connected to the second node, and a storage capacitor including a first electrode receiving the first power voltage and a second electrode connected to the first node.

In an embodiment, the data write transistor is an N-type transistor and the first light emission control transistor may be a P-type transistor.

In an embodiment, the data write transistor and the first light emission control transistor may form a Complementary Metal-Oxide-Semiconductor (CMOS).

In an embodiment, the pixel circuit may further include a second light emission control transistor including a gate electrode receiving the data write gate signal, a first electrode connected to the third node, and a second electrode connected to the anode electrode.

In an embodiment, the compensation transistor may be an N-type transistor and the second light emission control transistor may be a P-type transistor.

In an embodiment, the compensation transistor and the second light emission control transistor may form a CMOS.

In an embodiment, in a first period, the initialization gate signal and the data write gate signal may have a high voltage level.

In an embodiment, according to the pixel circuit and the display device including the pixel circuit, since some of the transistors included in the pixel circuit are the N-type transistors, a leakage current of the pixel circuit may be minimized. Since the data write transistor and the first light emission control transistor form a CMOS, an area of the pixel circuit may be reduced. Since the compensation transistor and the second light emission control transistor form a CMOS, the area of the pixel circuit may be reduced. Since the compensation transistor diode-connects the driving transistor, a threshold voltage of the driving transistor may be compensated. Since the second light emission control transistor is turned off in a non-emission period excluding a light emission period, a light emission of the light emitting element due to the leakage current flowing into the light emitting element may be prevented.

BRIEF DESCRIPTION OF THE DRAWINGS

The above and other features of embodiments of the invention will become more apparent by describing detailed embodiments thereof with reference to the accompanying drawings, in which.

DETAILED DESCRIPTION OF THE EMBODIMENTS

Figure 1:
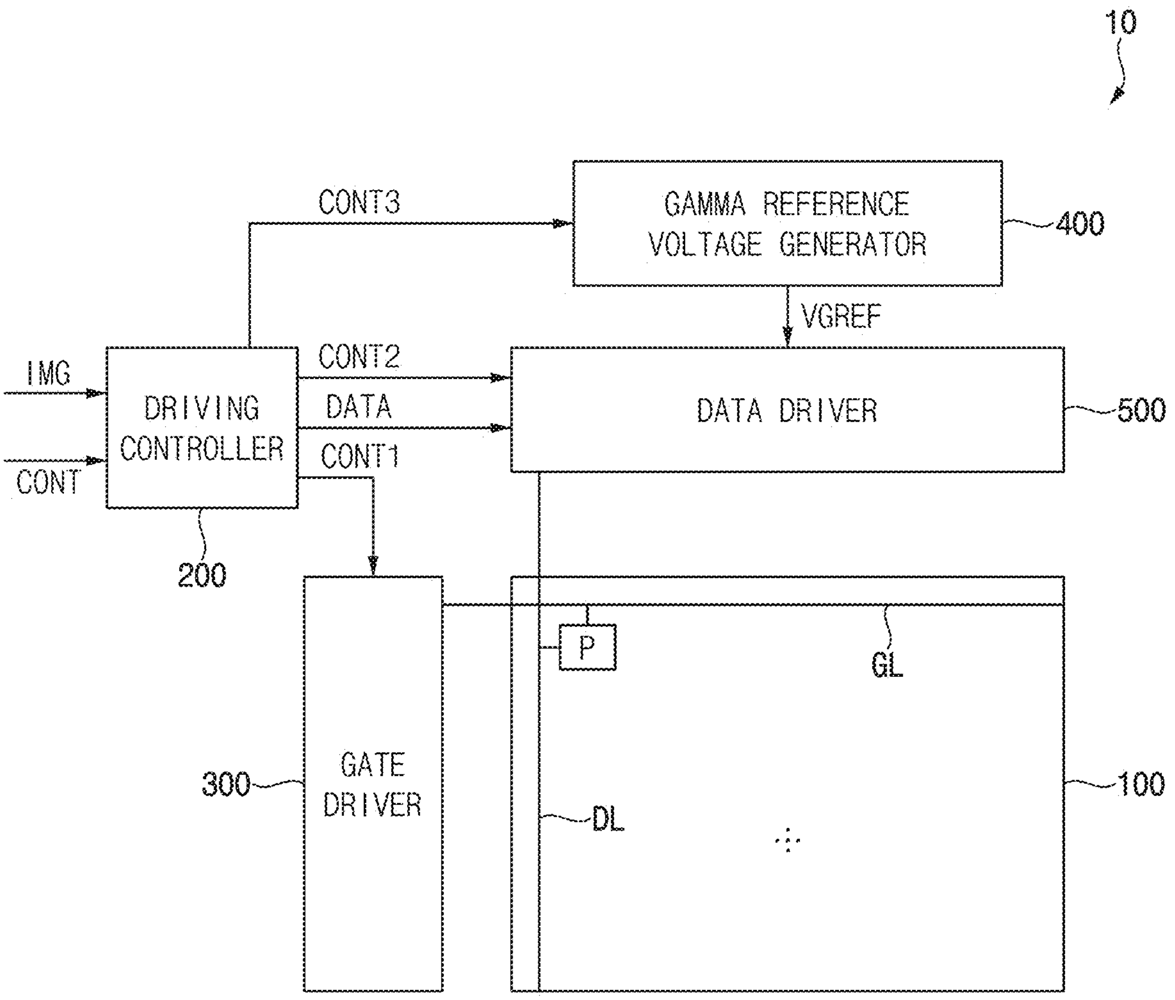
FIG. 1 is a block diagram illustrating a display device, according to an embodiment.

Hereinafter, the invention will be described in more detail with reference to the accompanying drawings, in which various embodiments are shown. Like reference numerals refer to like elements throughout.

It will be understood that when an element (or a region, a layer, a portion, or the like) is referred to as being related to another such as being "on", "connected to" or "coupled to" another element, it may be directly disposed on, connected or coupled to the other element, or intervening elements may be disposed therebetween.

Like reference numerals or symbols refer to like elements throughout. In the drawings, the thickness, the ratio, and the size of the element are exaggerated for effective description of the technical contents. As used herein, the term "and/or" includes any and all combinations of one or more of the associated listed items.

The term "and/or," may include all combinations of one or more of which associated configurations may define.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the inventive concept. Similarly, a second element, component, region, layer or section may be termed a first element, component, region, layer or section. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be further understood that the terms "comprise", "includes" and/or "have", when used in this specification, specify the presence of stated features, integers, steps, operations, elements, components, and/or groups thereof, but do not preclude the presence or addition of one or more other features, integers, steps, operations, elements, components, and/or groups thereof. As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a display device 10, according to an embodiment.

In an embodiment and referring to FIG. 1, a display device 10 may include a display panel 100 and a display panel driver. The display panel driver may include a driving controller 200, a gate driver 300, a gamma reference voltage generator 400, and a data driver 500.

In an embodiment, the driving controller 200 and the data driver 500 may be integrally formed. In another embodiment, the driving controller 200, the gamma reference voltage generator 400 and the data driver 500 may be integrally formed. In another embodiment, the driving controller 200, the gate driver 300, the gamma reference voltage generator 400 and the data driver 500 may be integrally formed. In an embodiment, a driving module in which at least the driving controller 200 and the data driver 500 are integrally formed may be referred to as a timing controller embedded data driver (TED).

In an embodiment, the display panel 100 may include a display region for displaying an image and a peripheral region disposed adjacent to the display region.

In an embodiment, the display panel 100 may be an organic light emitting diode display panel including an organic light emitting diode. In an embodiment, the display panel 100 may be a quantum-dot organic light emitting diode display panel including an organic light emitting diode and a quantum-dot color filter. In another embodiment, the display panel 100 may be a quantum-dot nano light emitting diode display panel including a nano light emitting diode and a quantum-dot color filter.

In an embodiment, the display panel 100 may include gate lines GL, data lines DL, and pixel circuits P electrically connected to the gate lines GL and the data lines DL. The gate lines GL may extend in a first direction, the data lines DL may extend in a second direction crossing the first direction.

In an embodiment, the driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal. In an embodiment, the driving controller 200 may generate a first control signal CONT1, a second control signal CONT2, a third control signal CONT3, and a data signal DATA based on the input image data IMG and the input control signal CONT.

In an embodiment, the driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

In an embodiment, the driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

In an embodiment, the driving controller 200 may generate the data signal DATA based on the input image data IMG. The driving controller 200 may output the data signal DATA to the data driver 500.

In an embodiment, the driving controller 200 may generate the third control signal CONT3 for controlling an operation of the gamma reference voltage generator 400 based on the input control signal CONT, and output the third control signal CONT3 to the gamma reference voltage generator 400.

In an embodiment, the gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral region of the display panel 100.

In an embodiment, the gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or may be disposed in the data driver 500.

In an embodiment, the data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

Figure 2:
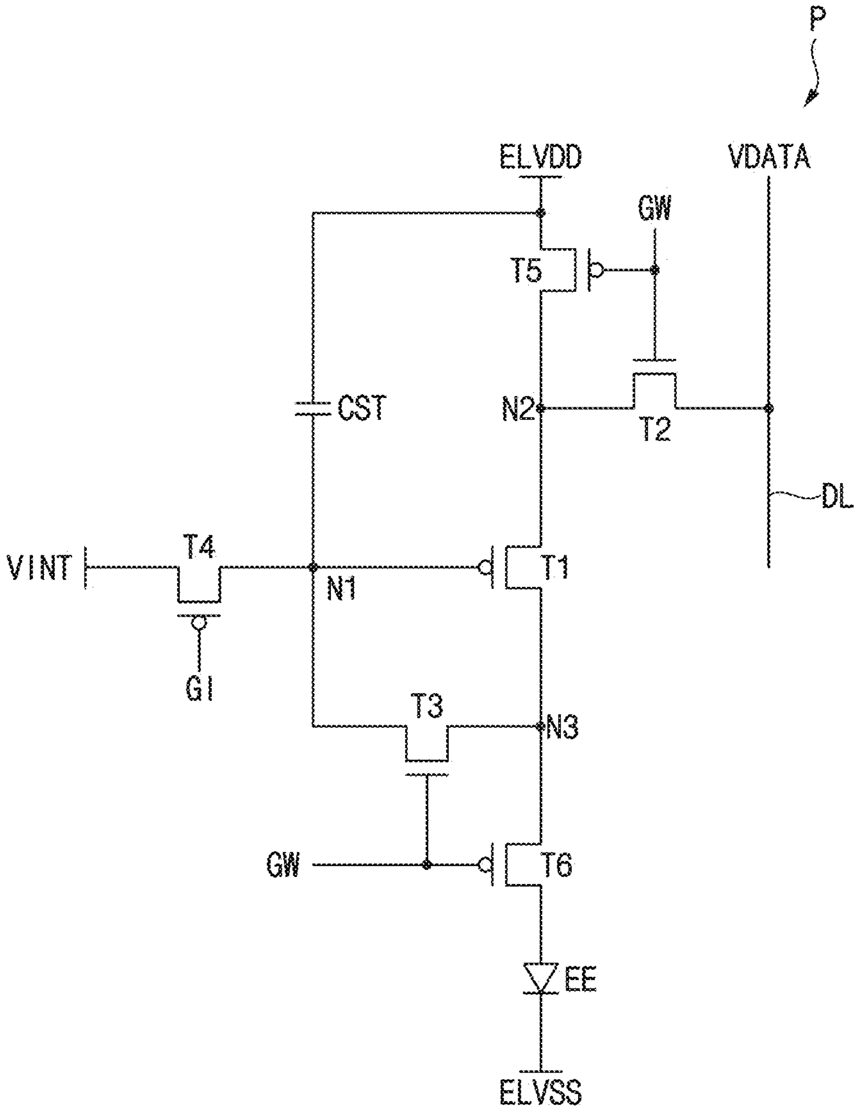
FIG. 2 is a circuit diagram illustrating an example of a pixel circuit of FIG. 1, according to an embodiment.
Figure 3:
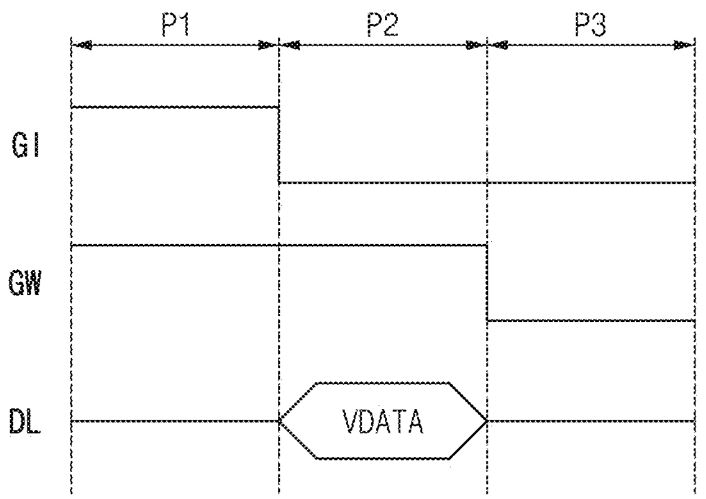
FIG. 3 is a timing diagram illustrating an example of driving the pixel circuit of FIG. 2, according to an embodiment.

FIG. 2 is a circuit diagram illustrating an example of a pixel circuit P of FIG. 1, according to an embodiment. FIG. 3 is a timing diagram illustrating an example of driving the pixel circuit P of FIG. 2, according to an embodiment.

In an embodiment and referring to FIGS. 1 to 3, a pixel circuit P may include a light emitting element EE, a driving transistor T1, a data write transistor T2, a compensation transistor T3, an initialization transistor T4, a first light emission control transistor T5, and a storage capacitor CST. In an embodiment, the pixel circuit P may further include a second light emission control transistor T6.

In an embodiment, the light emitting element EE may include an anode electrode and a cathode electrode receiving a second power voltage ELVSS.

In an embodiment, the driving transistor T1 may include a gate electrode connected to a first node N1, a first electrode connected to a second node N2, and a second electrode connected to a third node N3.

In an embodiment, the data write transistor T2 may include a gate electrode receiving a data write gate signal GW, a first electrode connected to a data line DL providing a data voltage VDATA, and a second electrode connected to the second node N2.

In an embodiment, the compensation transistor T3 may include a gate electrode receiving the data write gate signal GW, a first electrode connected to the third node N3, and a second electrode connected to the first node N1.

In an embodiment, the initialization transistor T4 may include a gate electrode receiving an initialization gate signal G1, a first electrode receiving an initialization voltage VINT, and a second electrode connected to the first node N1.

In an embodiment, the first light emission control transistor T5 may include a gate electrode receiving the data write gate signal GW, a first electrode receiving a first power voltage ELVDD, and a second electrode connected to the second node N2.

In an embodiment, the storage capacitor CST may include a first electrode receiving the first power voltage ELVDD and a second electrode connected to the first node N1.

In an embodiment, the second light emission control transistor T6 may include a gate electrode receiving the data write gate signal GW, a first electrode connected to the third node N3, and a second electrode connected to the anode electrode of the light emitting element EE.

In an embodiment, a leakage current may occur more in a P-type transistor than in an N-type transistor. Therefore, some of transistors included in the pixel circuit P may be the N-type transistors. In an embodiment, the compensation transistor T2 may be the N-type transistor, and the first light emission control transistor T4 may be the P-type transistor. In an embodiment, the driving transistor T1 and the data write transistor T3 may be the P-type transistors, and the second light emission control transistor T5 may be the N-type transistor. In an embodiment, the data write transistor T2 may be the N-type transistor and the first light emission control transistor T5 may be the P-type transistor. In an embodiment, the compensation transistor T3 may be the N-type transistor and the second light emission control transistor T6 may be the P-type transistor. In an embodiment, the driving transistor T1 may be the P-type transistor and the initialization transistor T4 may be the N-type transistor. In an embodiment, the data write transistor T2 and the first light emission control transistor T5 may form a Complementary Metal-Oxide-Semiconductor (CMOS). Therefore, a number of gate signals and a number of lines transmitting the gate signals may be reduced, and accordingly, an area of the pixel circuit P may be reduced. For example, when a signal applied to a gate electrode of the P-type transistor has a low voltage level, the P-type transistor may be turned on. For example, when the signal applied to the gate terminal of the P-type transistor has a high voltage level, the P-type transistor may be turned off. For example, when a signal applied to a gate electrode of the N-type transistor has the high voltage level, the N-type transistor may be turned on. For example, when the signal applied to the gate terminal of the N-type transistor has the low voltage level, the N-type transistor may be turned off.

In an embodiment, in a first period P1, the initialization gate signal G1 and the data write gate signal GW may have the high voltage level.

In an embodiment, in a second period P2 after the first period P1, the initialization gate signal G1 may have the low voltage level and the data write gate signal GW may have the high voltage level.

In an embodiment, in a third period P3 after the second period P2, the initialization gate signal G1 and the data write gate signal GW may have low voltage level.

Figure 4:
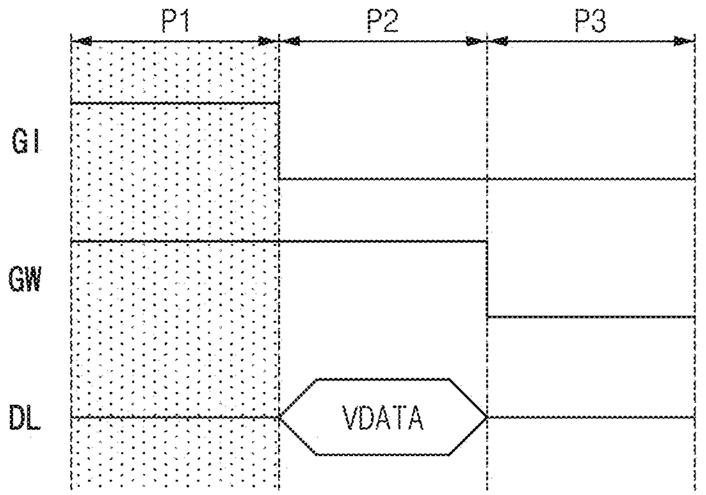
FIG. 4 is a timing diagram illustrating an example of the pixel circuit of FIG. 2 operating in a first period, according to an embodiment.
Figure 5:
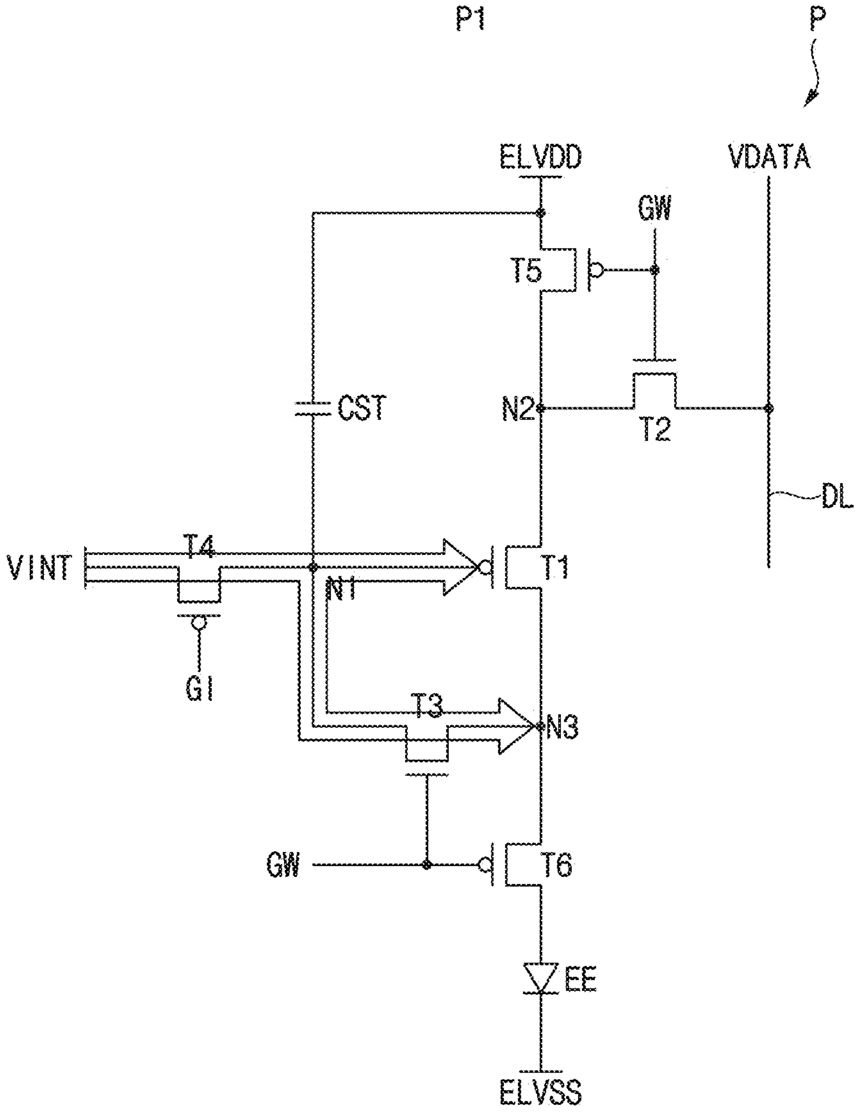
FIG. 5 is a circuit diagram illustrating an example of the pixel circuit of FIG. 2 operating in the first period, according to an embodiment.

FIG. 4 is a timing diagram illustrating an example of the pixel circuit P of FIG. 2 operating in the first period P1, according to an embodiment. FIG. 5 is a circuit diagram illustrating an example of the pixel circuit P of FIG. 2 operating in the first period P1, according to an embodiment.

In an embodiment and referring to FIGS. 1 to 5, in the first period P1, the compensation transistor T3 and the initialization transistor T4 may be turned on, and the data write transistor T2, the first light emission control transistor T5, and the second light emission control transistor T6 may be turned off.

In an embodiment, when the compensation transistor T3 and the initialization transistor T4 are turned on, the initialization transistor T4 may provide the initialization voltage VINT to the first node N1 (i.e., the gate electrode of the driving transistor T1), and the initialization transistor T4 and the compensation transistor T3 may provide the initialization voltage VINT to the third node N3 (i.e., the second electrode of the driving transistor T1). The first node N1 and the third node N3 may be initialized to the initialization voltage VINT.

Figure 6:
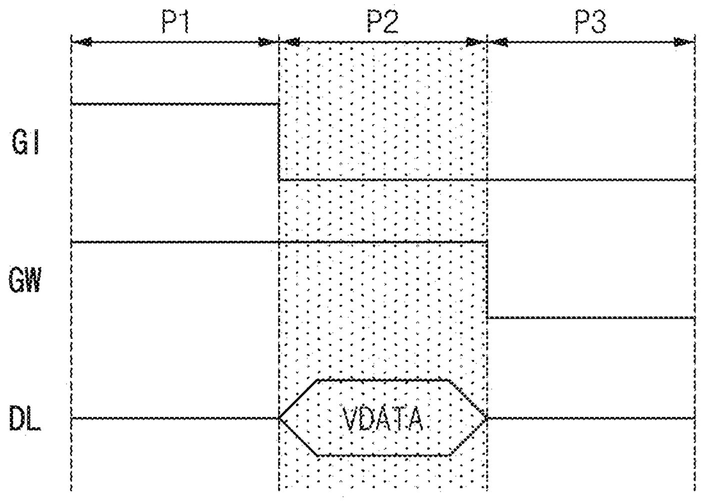
FIG. 6 is a timing diagram illustrating an example of the pixel circuit of FIG. 2 operating in a second period, according to an embodiment.
Figure 7:
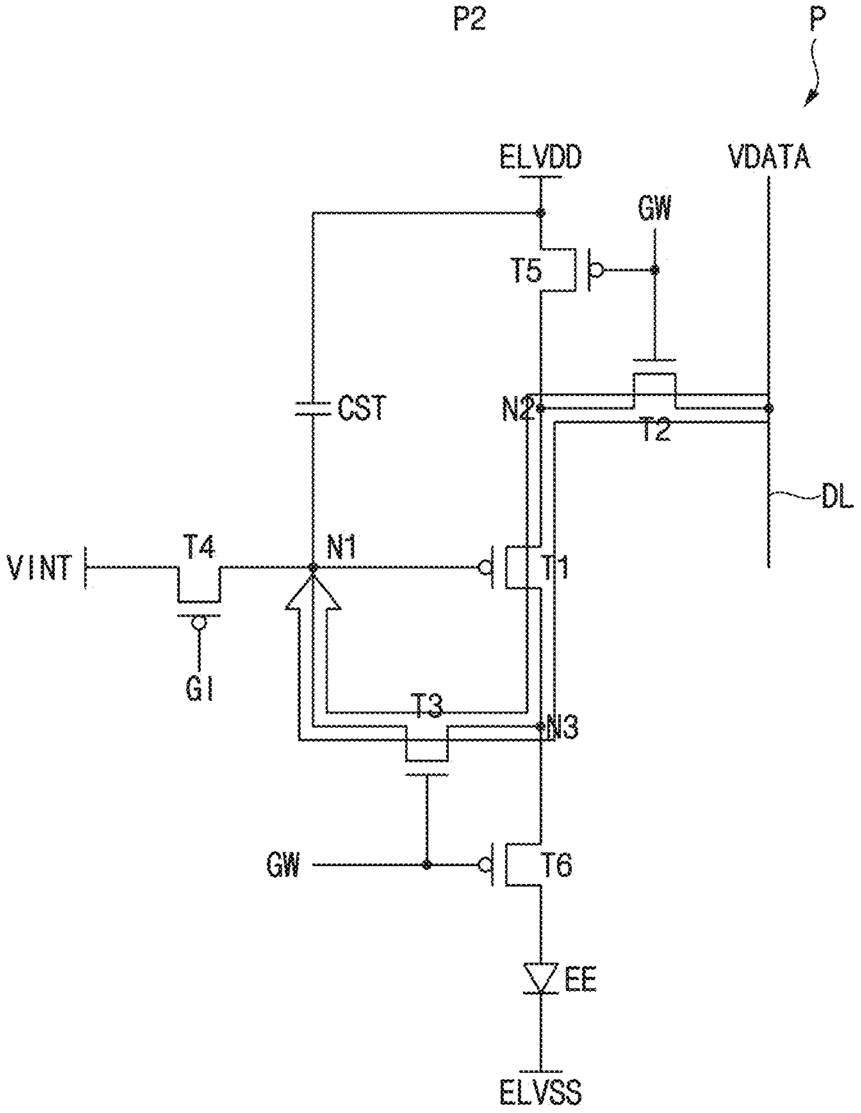
FIG. 7 is a circuit diagram illustrating an example of the pixel circuit of FIG. 2 operating in the second period, according to an embodiment.

FIG. 6 is a timing diagram illustrating an example of the pixel circuit P of FIG. 2 operating in the second period P2, according to an embodiment. FIG. 7 is a circuit diagram illustrating an example of the pixel circuit P of FIG. 2 operating in the second period P2, according to an embodiment.

In an embodiment and referring to FIGS. 1 to 7, in the second period P2, the data write transistor T2 and the compensation transistor T3 may be turned on, and the initialization transistor T4, the first light emission control transistor T5, and the second light emission control transistor T6 may be turned off.

In an embodiment, when the data write transistor T2 and the compensation transistor T3 are turned on, the data voltage VDATA may be provided to the first node N1 (i.e., the first electrode of the driving transistor T1) through the data write transistor T2, the driving transistor T1, and the compensation transistor T3.

In an embodiment, when the compensation transistor T3 is turned on, the compensation transistor T3 may diode-connect the driving transistor T1. Therefore, a threshold voltage of the driving transistor T1 may be compensated.

Meanwhile, in an embodiment, since the second light emission control transistor T6 is turned off in the first period P1 and the second period P2, a light emission of the light emitting element EE due to the leakage current flowing to the light emitting element EE may be prevented.

Figure 8:
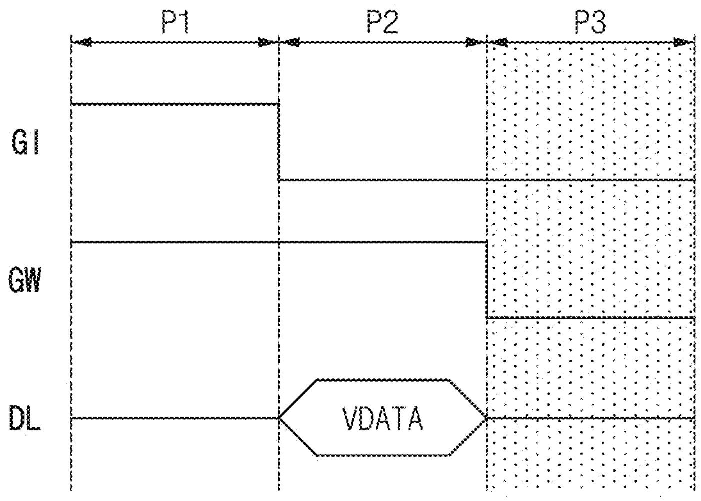
FIG. 8 is a timing diagram illustrating an example of the pixel circuit of FIG. 2 operating in a third period, according to an embodiment.
Figure 9:
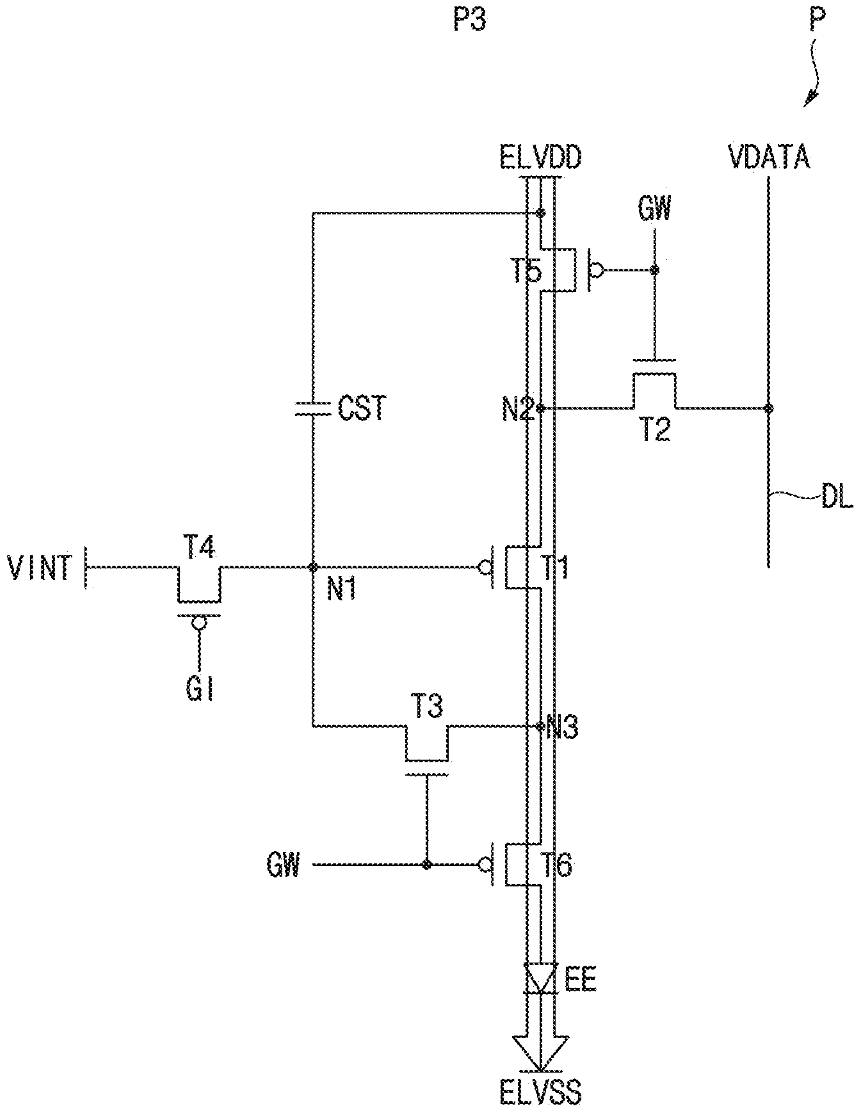
FIG. 9 is a circuit diagram illustrating an example of the pixel circuit of FIG. 2 operating in the third period, according to an embodiment.

FIG. 8 is a timing diagram illustrating an example of the pixel circuit P of FIG. 2 operating in the third period P3, according to an embodiment. FIG. 9 is a circuit diagram illustrating an example of the pixel circuit P of FIG. 2 operating in the third period P3, according to an embodiment.

Referring to FIGS. 1 to 9, in the third period P3, the first light emission control transistor T5 and the second light emission control transistor T6 may be turned on, and the data write transistor T2, the compensation transistor T3, and the initialization transistor T4 may be turned off.

In an embodiment, the voltage of the first node N1 may be determined based on the data voltage VDATA, the driving current of the driving transistor T1 may be determined based on the voltage of the first node N1, and the driving transistor T1 may provide the driving current to the light emitting element EE. The light emitting element EE may emit a light with a luminance corresponding to the driving current.

In an embodiment, since some of the transistors included in the pixel circuit P are the N-type transistors, the leakage current of the pixel circuit P may be minimized. Since the data write transistor T2 and the first light emission control transistor T5 form CMOS, the area of the pixel circuit P may be reduced. Since the compensation transistor T3 and the second light emission control transistor T6 form CMOS, the area of the pixel circuit P may be reduced. Since the compensation transistor T3 diode-connects the driving transistor T1, the threshold voltage of the driving transistor T1 may be compensated. Since the second light emission control transistor T6 is turned off in a non-emission period excluding a light emission period, the light emission of the light emitting element EE due to the leakage current flowing into the light emitting element EE may be prevented.

Figure 10:
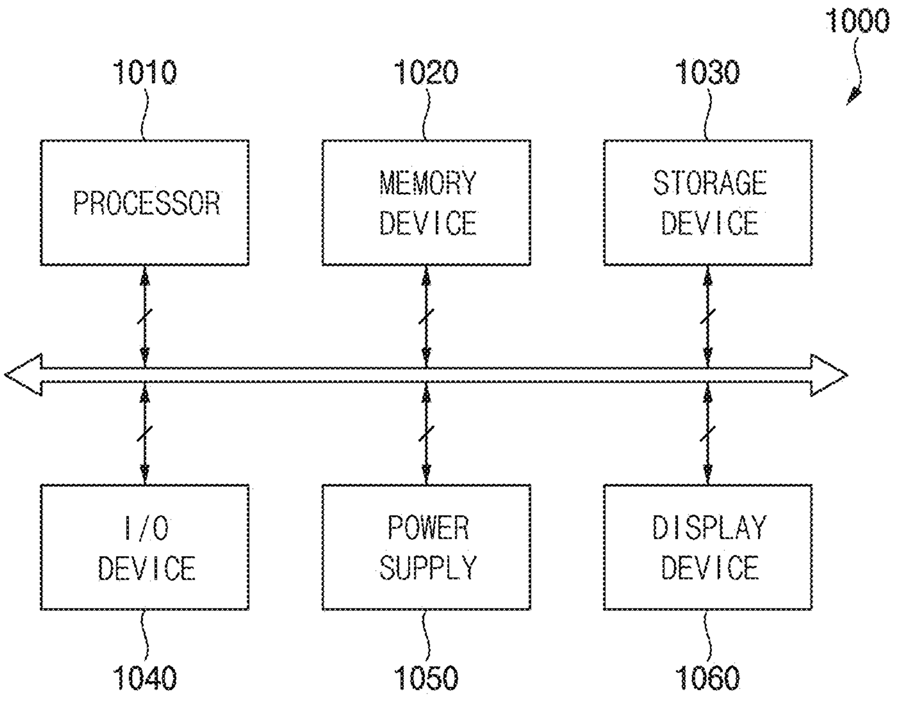
FIG. 10 is a block diagram illustrating an electronic device, according to an embodiment.
Figure 11:
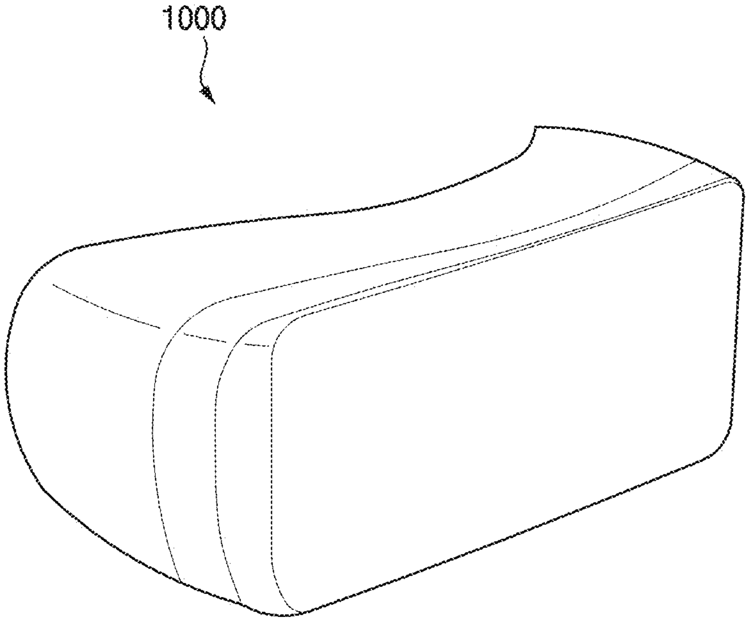
FIG. 11 is a diagram illustrating an embodiment in which the electronic device 1000 of FIG. 10 is implemented as a VR device.

FIG. 10 is a block diagram illustrating an electronic device 1000, according to an embodiment. FIG. 11 is a diagram illustrating an embodiment in which the electronic device 1000 of FIG. 10 is implemented as a VR device.

In an embodiment and referring to FIGS. 10 and 11, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 11, the electronic device 1000 may be implemented as a VR device. However, the electronic device 1000 is not limited thereto. In other embodiments, the electronic device 1000 may be implemented as a cellular phone, a video phone, a smart pad, a smart watch, a tablet PC, a car navigation system, a computer monitor, a laptop, a head mounted display (HMD) device, and the like.

In an embodiment, the processor 1010 may perform various computing functions. The processor 1010 may be a micro-processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

In an embodiment, the memory device 1020 may store data for operations of the electronic device 1000. For example, the memory device 1020 may include at least one of a non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one of a volatile memory device such as a dynamic random access memory (DRAM) device, a static random access memory (SRAM) device, a mobile DRAM device, and the like.

In an embodiment, the storage device 1030 may include a solid-state drive (SSD) device, a hard disk drive (HDD) device, a CD-ROM device, and the like.

In an embodiment, the I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

In an embodiment, the power supply 1050 may provide power for operations of the electronic device 1000.

In an embodiment, the display device 1060 may be connected to other components through buses or other communication links.

Embodiments of the invention may be applied to any display device and any electronic device including the touch panel. In an embodiment, the invention may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the invention and is not to be construed as limiting thereof. Although a few embodiments of the invention have been described, those skilled in the art will readily appreciate that many modifications are possible without materially departing from the scope of the invention. Accordingly, all such modifications are intended to be included within the scope of the invention. In the claims, any means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the invention. Moreover, the embodiments or parts of the embodiments may be combined in whole or in part without departing from the scope of the invention.

What is claimed is:

1. A pixel circuit comprising:

a light emitting element including an anode electrode and a cathode electrode receiving a second power voltage;

a driving transistor including a gate electrode connected to a first node, a first electrode connected to a second node, and a second electrode connected to a third node;

a data write transistor including a gate electrode which receives a data write gate signal, a first electrode connected to a data line which provides a data voltage, and a second electrode connected to the second node;

a compensation transistor including a gate electrode which receives the data write gate signal, a first electrode connected to the third node, and a second electrode connected to the first node;

an initialization transistor including a gate electrode which receives an initialization gate signal, a first electrode which receives an initialization voltage, and a second electrode connected to the first node;

a first light emission control transistor including a gate electrode which receives the data write gate signal, a first electrode which receives a first power voltage, and a second electrode connected to the second node; and a storage capacitor including a first electrode which receives the first power voltage and a second electrode connected to the first node.

2. The pixel circuit of claim 1, further comprising:

a second light emission control transistor including a gate electrode which receives the data write gate signal, a first electrode connected to the third node, and a second electrode connected to the anode electrode.

3. The pixel circuit of claim 2, wherein, in a first period, the initialization gate signal and the data write gate signal have a high voltage level.

4. The pixel circuit of claim 3, wherein, in a second period after the first period, the initialization gate signal has a low voltage level and the data write gate signal has the high voltage level.

5. The pixel circuit of claim 4, wherein, in a third period after the second period, the initialization gate signal and the data write gate signal have the low voltage level.

6. The pixel circuit of claim 5, wherein, in the third period, a driving current of the driving transistor flows to the light emitting element.

7. The pixel circuit of claim 4, wherein, in the second period, the data voltage is provided to the gate electrode of the driving transistor through the data write transistor, the driving transistor, and the compensation transistor.

8. The pixel circuit of claim 4, wherein, in the second period, when the compensation transistor is turned on, the compensation transistor diode-connects the driving transistor.

9. The pixel circuit of claim 3, wherein, in the first period, the initialization transistor provides the initialization voltage to the first node and the initialization transistor and the compensation transistor provide the initialization voltage to the third node.

10. The pixel circuit of claim 2, wherein the compensation transistor is an N-type transistor and the second light emission control transistor is a P-type transistor.

11. The pixel circuit of claim 10, wherein the compensation transistor and the second light emission control transistor form a CMOS.

12. The pixel circuit of claim 1, wherein the data write transistor is an N-type transistor and the first light emission control transistor is a P-type transistor.

13. The pixel circuit of claim 12, wherein the data write transistor and the first light emission control transistor form a Complementary Metal-Oxide-Semiconductor (CMOS).

14. A display device comprising:

a display panel including a pixel circuit; and a display panel driver which drives the display panel, wherein the pixel circuit includes:

a light emitting element including an anode electrode and a cathode electrode which receives a second power voltage;

a driving transistor including a gate electrode connected to a first node, a first electrode connected to a second node, and a second electrode connected to a third node;

a data write transistor including a gate electrode which receives a data write gate signal, a first electrode connected to a data line which provides a data voltage, and a second electrode connected to the second node;

a compensation transistor including a gate electrode which receives the data write gate signal, a first electrode connected to the third node, and a second electrode connected to the first node;

an initialization transistor including a gate electrode which receives an initialization gate signal, a first electrode which receives an initialization voltage, and a second electrode connected to the first node;

a first light emission control transistor including a gate electrode which receives the data write gate signal, a first electrode which receives a first power voltage, and a second electrode connected to the second node; and a storage capacitor including a first electrode which receives the first power voltage and a second electrode connected to the first node.

15. The display device of claim 14, further comprising:

a second light emission control transistor including a gate electrode which receives the data write gate signal, a first electrode connected to the third node, and a second electrode connected to the anode electrode.

16. The display device of claim 15, wherein the compensation transistor is an N-type transistor and the second light emission control transistor is a P-type transistor.

17. The display device of claim 16, wherein the compensation transistor and the second light emission control transistor form a CMOS.

18. The display device of claim 15, wherein, in a first period, the initialization gate signal and the data write gate signal have a high voltage level.

19. The display device of claim 14, wherein the data write transistor is an N-type transistor and the first light emission control transistor is a P-type transistor.

20. The display device of claim 19, wherein the data write transistor and the first light emission control transistor form a Complementary Metal-Oxide-Semiconductor (CMOS).

* * * * *